United States Patent [19]

Kitamura

[11] 3,753,033

[45] Aug. 14, 1973

[54] HIGH-VOLTAGE STABILIZER

[75] Inventor: Yoshinori Kitamura, Osaka, Japan

[73] Assignee: Matsushita Electric Industrial Co., Ltd., Kadoma-shi, Osaka, Japan

[22] Filed: Nov. 23, 1970

[21] Appl. No.: 91,710

[30] Foreign Application Priority Data

Dec. 2, 1969 Japan ................................ 44/97410
Dec. 6, 1969 Japan ................................ 44/98145

[52] U.S. Cl. .................................................. 315/29
[51] Int. Cl. ............................................. H01j 29/70
[58] Field of Search ...................... 315/29 R, 28, 29, 315/27 TD

[56] References Cited

UNITED STATES PATENTS

| | | | |
|---|---|---|---|
| 3,673,458 | 6/1972 | Moggre | 315/27 TD |
| 2,809,327 | 10/1957 | Wolfe | 315/29 X |
| 2,921,230 | 1/1960 | Hopengarten et al. | 315/29 X |
| 3,079,561 | 2/1963 | Janssen et al. | 315/27 R X |
| 3,396,309 | 8/1968 | Wolfe | 315/27 R X |
| 3,447,027 | 4/1969 | Kramer | 315/27 R X |
| 3,500,116 | 3/1970 | Rietveld et al. | 316/27 R X |
| 3,519,877 | 7/1970 | Bathias | 315/27 R X |
| 3,517,250 | 6/1970 | Hirschmann | 315/27 R X |
| 3,539,837 | 11/1970 | Stevens | 315/27 R X |

*Primary Examiner*—Carl D. Quarforth
*Assistant Examiner*—P. A. Nelson
*Attorney*—Stevens, Davis, Miller & Mosher

[57] ABSTRACT

A horizontal deflection circuit is connected with a series resonance circuit consisting of a boosting transformer and a capacitor, said series resonance circuit being appropriately resonated to generate resonance pulses other than pulses which are generated upon cutting off a switching element inserted in said horizontal deflection circuit, thereby to stabilize a high voltage.

8 Claims, 12 Drawing Figures

Y. KITAMURA
INVENTOR

BY Stevens, Davis, Miller & Mosher
ATTORNEYS

HIGH-VOLTAGE STABILIZER

The present invention relates to a high-voltage stabilizing device.

An object of the present invention is to provide a high-voltage stabilizing device for stabilizing a high voltage by means of resonance pulses generated in a series resonance circuit which consists of a boosting transformer and a capacitor and is connected with a horizontal deflection circuit.

Another object of the present invention is to provide a simple circuit arrangement for stabilizing a high voltage.

Still another object of the present invention is to realize a circuit arrangement by which a high voltage generated can be easily modified or regulated.

Still another object of the present invention is to provide a high-voltage stabilizing device which automatically controls its resonance characteristics by detecting variations in a high-voltage load and which consumes little power for said control operations.

The above and other objects, features and advantages will be made apparent by the detailed description taken in conjunction with the accompanying drawings, in which.

Figure 6:
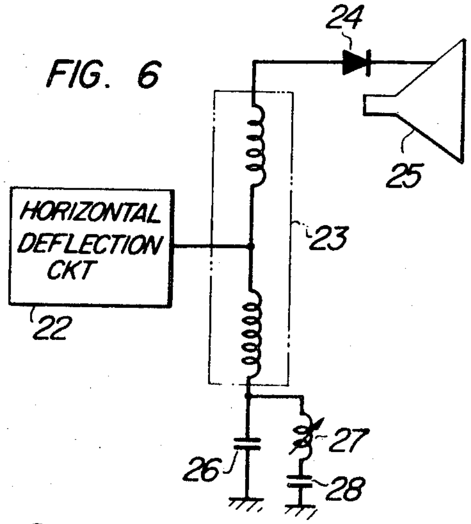
Figure 5A:
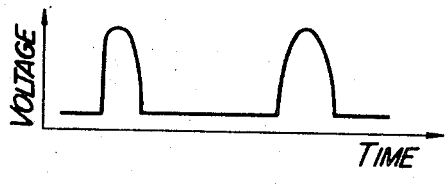
Figure 5B:
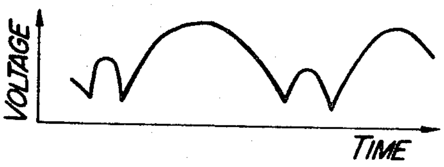
Figure 5C:
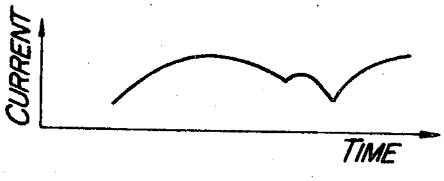
Figure 7A:
Figure 7B:
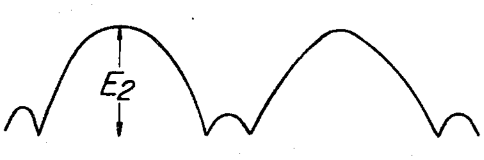
Figures 8, 9:
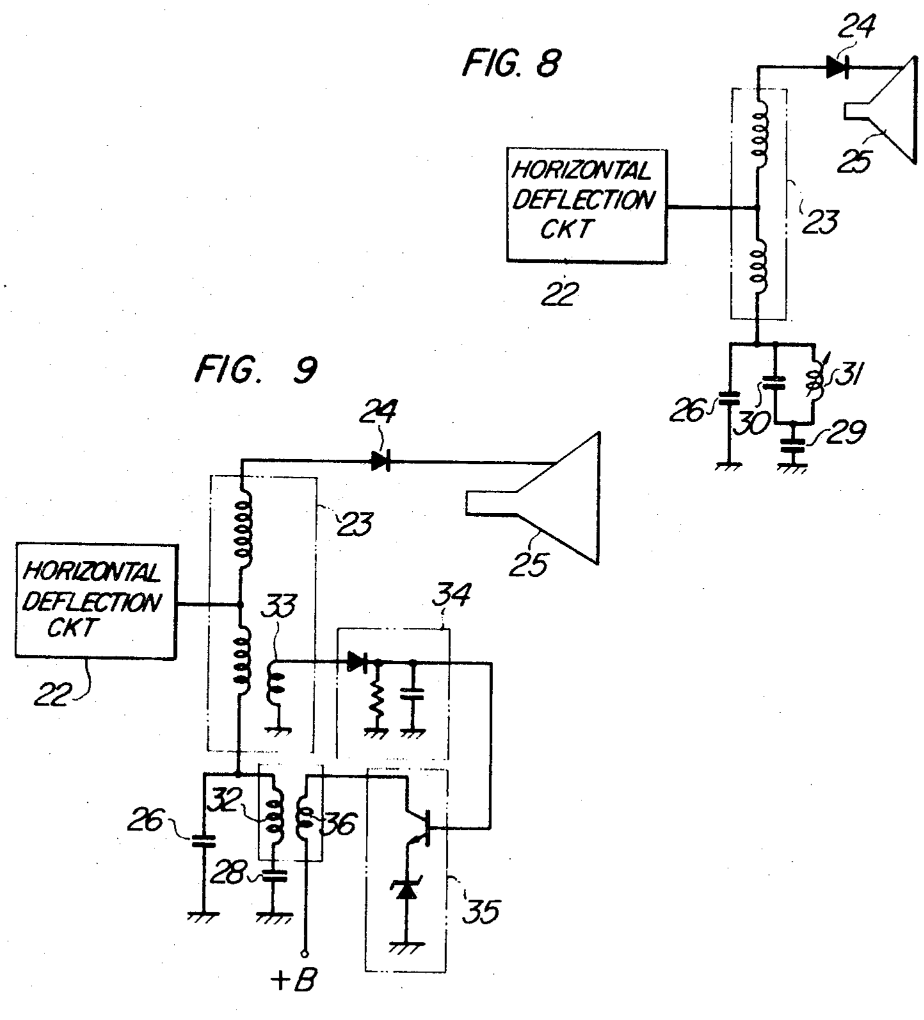

FIGS. 5*a*, 5*b* and 5*c* are diagrams showing the output waveforms of the essential components of said high-voltage stabilizing device embodying the present invention;

FIG. 6 is an electric circuit diagram showing the essential components of another embodiment of the present invention;

FIGS. 7*a* and 7*b* are diagrams showing the output waveforms of the essential components of the embodiment shown in FIG. 6;

FIG. 8 is an electric circuit diagram showing the essential components of still another embodiment of the present invention; and FIG. 9 is an electric circuit diagram showing the essential components of still another embodiment of the present invention.

Figure 1:
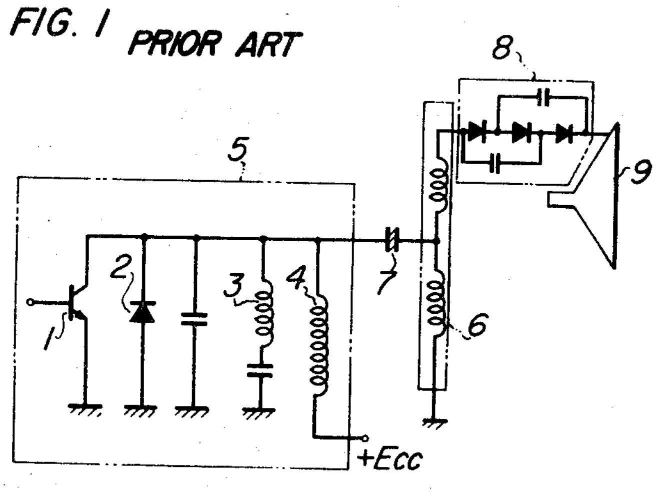
FIG. 1 PRIOR ART
FIG. 1 is an electric circuit diagram showing the essential components of a conventional high-voltage device.
Figure 2:
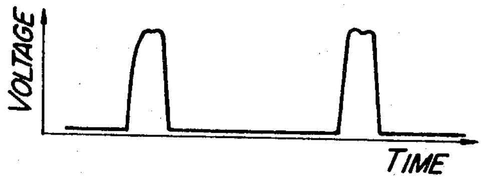
FIG. 2 PRIOR ART
FIG. 2 is a diagram showing the output waveform of the essential components of said conventional high-voltage device.

In the conventional television receiver, as shown in FIG. 1, a horizontal deflection circuit 5 which consists of a horizontal output transistor 1, a damper diode 2, a deflecting yoke 3 and a choke coil 4 is connected with a transformer 6 through a capacitor 7, and an output terminal of the transformer 6 is connected with a cathode-ray tube 9 through a voltage doubler circuit 8. For this reason, output pulses or flyback pulses which are generated by the horizontal deflection circuit 5 in accordance with the on-off operations of the horizontal output transistor 1 and whose waveform is as shown in FIG. 2 is applied to the transformer 6 through the capacitor 7 whose impedance is sufficiently low at the switching frequency of the horizontal output transistor 1.

The voltage applied to the capacitor 7 has the same waveform as the output of the horizontal deflection circuit 5 and therefore the width of a pulse applied to the voltage doubler circuit 8 is 10 to 15 $\mu$ sec, so that conduction of the voltage doubler circuit 8 is reduced, resulting in an inferior high-voltage stability.

To improve the high-voltage stability, the fifth higher harmonics of the switching frequency of the horizontal output transistor 1 may be generated by a resonance circuit comprising an inductance and distributed capacity of the secondary winding of the transformer 6, thereby lengthening the period of conduction of the diodes making up the voltage doubler circuit 8. However, this method has the disadvantage that productivity becomes low since very carful regulation is required during the manufacturing processes to generate the fifth higher harmonics.

Figure 3:
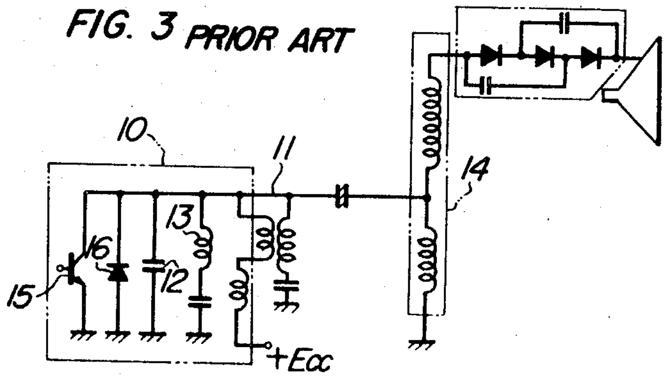
FIG. 3 PRIOR ART
FIG. 3 is an electric circuit diagram showing a conventional high-voltage stabilizing device.

Still another conventional method of improving the high-voltage stability includes a device as shown in FIG. 3 in which a horizontal deflection circuit 10 is connected with a regulating reactor 11. In this case, the width of a flyback pulse is determined by a resonance frequency in connection with the combined inductance of a capacitor 12, a deflection coil 13, a reactor 11 and a transformer 14, the amplitude of the flyback pulse and therefore the high voltage generated being variable by changing the resonance frequency. It follows therefore that the high voltage can be stabilized by varying the reactor 11. In other words, when the output voltage drops due to an increased high-voltage load, the current flowing in the exciting winding of the reactor 11 is made to increase and its inductance is reduced so that the drop in output volage is compensated for by increasing the resonance frequency.

In this high-voltage stabilizing device, however, the reactive power and power consumption in the circuit is increased because of the extra reactor 11. At the same time, more current flows in the horizontal output transistor 15 and damper diode 16 and therefore these elements have to be larger in capacitance.

Figure 4:
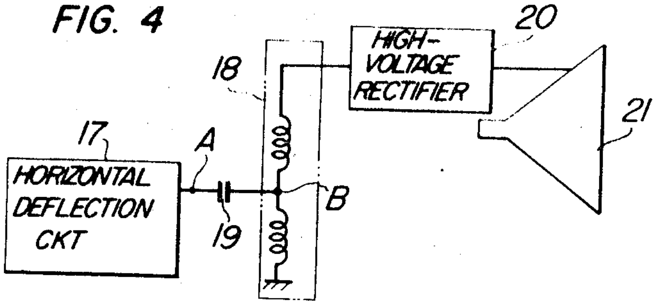
FIG. 4 is an electric circuit diagram showing the essential components of a high-voltage stabilizing device embodying the present invention.

The present invention is aimed at obviating these disadvantages of the conventional device and will be explained below with reference to its embodiments as shown in the accompanying drawings. Referring to FIG. 4, numeral 17 shows a horizontal deflection circuit comprising a horizontal output transistor and damper diode, and numeral 18 a boosting transformer connected to the horizontal deflection circuit 17 through the capacitor 19. The transformer 18 and the capacitor 19 make up a series resonance circuit which is resonated at a specified frequency as described later. Numeral 20 shows a high-voltage rectifying circuit connected with the transformer 18 and numeral 21 a cathode-ray tube connected with said high-voltage rectifying circuit 20.

The operation of the high-voltage stabilizing device of the above construction will now be explained with reference to FIGS. 5*a*, 5*b* and 5*c*.

The horizontal deflection circuit 17 generates at the output terminal A flyback pulses with the waveform as shown in FIG. 5*a*. Such flyback pulses are generated in the well known way when the horizontal output transistor inserted in the horizontal deflection circuit 17 is cut off, that is, in the blanking or flyback periods of the horizontal scanning periods. In sweep periods of the horizontal scanning periods, though the horizontal output transistor is turned on and therefore the terminal A is reduced almost to ground potential, the energy stored in the transformer 18 resonates the resonance circuit consisting of the capacitance 19 and of the transformer 18 thereby generating resonance pulses. Accordingly, pulses with a waveform as shown in FIG. 5*b* are generated at the input terminal B of the transformer 18 by approximating the resonance frequency of the resonance circuit to the horizontal scanning frequency at which the horizontal output transistor switches. Then a voltage similar in waveform is applied to the high-voltage rectifying circuit 20 so that said rectifying circuit 20 is made to conduct for a sufficiently long period of time, making high-voltage stabilization possible.

Since the waveform of the voltage applied to the high-voltage rectifying circuit 20 is relatively smooth, there is only a small loss due to a recovery current which is generated after the rectifying diode making up the rectifying circuit 20 is cut off. Also, a current with a waveform as shown in FIG. 5*c* flows in the windings of the transformer 18 constituting the resonance circuit and for this reason less current flows in the horizontal output transistor constituting the horizontal deflection circuit 17 in the latter half of one horizontal scanning period.

Another embodiment of the present invention will be explained below with reference to FIG. 6. Numeral 22 shows a horizontal deflection circuit, numeral 23 a boosting transformer to which the output of the horizontal deflection circuit 22 is applied, numeral 24 a rectifying diode and numeral 25 a cathode-ray tube to which a high voltage is applied through the diode 24. Numeral 26 shows a capacitor, numeral 27 a variable inductance and numeral 28 a capacitor connected in series with the variable inductance 27. The capacitor 26, inductance 27 and capacitor 28 make up a capacitive reactance which is resonated with the inductance of the transformer 23 at or around the horizontal scanning frequency. That is to say, an equivalent capacitance $C_0$ of a series circuit consisting of the variable inductance 27 and capacitor 28 is $$C_0 = C/1 - \omega^2 LC \,,\ (1 - \omega^2 LC > 0)$$

where L is the value of the variable inductance 27 and C the value of the capacitor 28. According to the above formula, the equivalent capacitance $C_0$ varies as the inductance L varies. Pulses resonant with the equivalent capacitance $C_0$ as shown in FIGS. 7*a* and 7*b* are superposed on the flyback pulses produced at the horizontal deflection circuit 22 and the resultant combined voltage appears in the winding of the transformer 23. If a frequency higher than the horizontal scanning frequency is selected as the resonance frequency, pulses as shown in FIG. 7*a* are produced in the primary winding of the transformer 23. Here this pulse is expressed as $E_1$. When said the equivalent capacitance $C_0$ is made larger to approximate its resonance frequency to the horizontal scanning frequency, the impedance to the horizontal scanning frequency becomes lower with the result that more current flows in the transformer 23 so that pulses as shown in FIG. 7*b*, whose voltage, expressed as $E_2$, is higher than $E_1$. Since a high voltage is obtained by boosting these pulse voltages, such a high voltage can be regulated in accordance with the variations in the value of variable inductance 27. Incidentally, a high frequency ringing current generated in the high-voltage winding of the transformer 23 is bypassed through the capacitor 26 and therefore the series circuit of the variable inductance 27 and capacitor 28 in no way adversely affects the characteristics of the transformer 23.

In the embodiment shown in FIG. 6, like the one shown in FIG. 4, it is possible to make the duration of conduction of the diode 24 sufficiently long so as to achieve the stabilization of a high voltage.

Still another embodiment of the present invention is shown in FIG. 8. The components symbolized by numerals 22 to 26 are the same as those with the same numerals shown in FIG. 3 and therefore will not be explained here. Numerals 29 and 30 show capacitors inserted according to the present invention, and numeral 31 a variable inductance. The parallel circuit consisting of the capacitor 30 and variable inductance 31 is connected in series with the capacitor 29 and all of the three components are connected in parallel with the capacitor 26. Let the values of capacitors 29 and 30 be $C_1$ and $C_2$ respectively, and the value of the variable inductance 31 be L. Then the equivalent capacitance $C_o$ of the circuit consisting of the components 29, 30 and 31 will be:

$$C_o = [C_1\ (\omega^2 LC_2 - 1)]/[\omega^2 L(C_1 + C_2) - 1],\ (C_o > 1)$$

It will be understood from this equation that $C_o$ varies with L so that a high voltage can be varied.

An example of a high-voltage stabilizing device employing the circuit shown in FIG. 6 is illustrated in FIG. 9, in which a horizontal deflection output is applied to the transformer 23, a high voltage in the secondary circuit of the transformer 23 is applied through the rectifier 24 to the cathoderay tube 25, and the primary of the transformer 23 is connected in series with the capacitor 26, in exactly the same way as the circuit shown in FIG. 6. Components which function the same way as those shown in FIG. 6 will be provided with the same numerals respectively and their explanation will be omitted here. The capacitor 26 is connected in parallel with the series circuit comprising the variable reactor 32 and capacitor 28, the value of the variable reactor 32 being varied according to a d-c current flowing in the exciting winding 36. Numeral 33 shows a winding for detecting a voltage change and wound on the transformer 23, numeral 34 a rectifying device and numeral 35 an amplifier with its output applied to the exciting winding 36. Now let us assume that the load of the high-voltage device increases. Then the rectified voltage of the rectifying device 34 drops and the resultant voltage is amplified by the amplifier 35, so that the exciting current of the variable reactor 32 is reduced, thereby increasing the inductance thereof to compensate for the voltage drop. In this case, the current which flows in the variable reactor 32 is a branch of the current flowing in the capacitor 26 and therefore small in amount, so that a low-value one suffices as the variable reactor 32. Further, since there is no increase in reactive power, this embodiment has an excellent feature in that neither the horizontal output transistor nor the damper diode is overburdened.

In the embodiment shown in FIG. 9, a well-known arrangement in which variations in voltage are detected from a dividing point of a focus bleeder resistor, instead of detecting variations in the voltage by means of the voltage-variation detecting winding 33 as provided in the transformer 23.

What is claimed is:

1. A high-voltage stabilizing device comprising a horizontal deflection circuit including a switching element;

a boosting transformer; and a series circuit of a variable inductance and a capacitor, said series circuit being connected with said transformer for constituting a series resonance circuit together with said transformer, said horizontal deflection circuit being connected with said series resonance circuit to generate a flyback pulse in the primary winding of said transformer each time said switching element of said horizontal deflection circuit is cut off, said resonance circuit being excited by each of said flyback pulses to generate in the primary winding of said transformer a resonance pulse of the same polarity as said flyback pulse between respective adjacent ones of said flyback pulses, said transformer boosting a combined voltage of said flyback pulses and said resonance pulses to produce a high voltage in the high voltage winding of said transformer, and said high voltage being controlled in accordance with the value of said variable inductance.

2. A high-voltage stabilizing device according to claim 1, in which said series circuit consisting of the variable inductance and the capacitor is inserted between ground and said transformer, and a second capacitor is connected in parallel with said series circuit to bypass a higher harmonic generated in the high voltage winding of said transformer.

3. A high-voltage stabilizing device according to claim 1, in which the resonance frequency of said resonance circuit is approximated to a horizontal scanning frequency at which said switching element of said horizontal deflection circuit switches.

4. A high-voltage stabilizing device comprising a horizontal deflection circuit including a switching element; a boosting transformer; and a capacitor connected with said transformer for constituting a series resonance circuit together with said transformer, said horizontal deflection circuit being connected with said series resonance circuit to generate a flyback pulse in the primary winding of said transformer each time said switching element of said horizontal deflection circuit is cut off, said resonance circuit being excited by each of said flyback pulses to generate in the primary winding of said transformer a resonance pulse of the same polarity as said flyback pulse between respective adjacent ones of said flyback pulses, and said transformer boosting a combine voltage of said flyback pulses and said resonance pulses to produce a high voltage in the high voltage winding of said transformer.

5. A high-voltage stabilizing device according to claim 4, in which the resonance frequency of said resonance circuit is approximated to a horizontal scanning frequency at which said switching element of said horizontal deflection circuit switches.

6. A high-voltage stabilizing device comprising a horizontal deflection circuit including a switching element; a boosting transformer; and a series circuit of a first capacitor and a parallel circuit of a variable inductance and a second capacitor, said series circuit being connected with said transformer for constituting a series resonance circuit together with said transformer, said horizontal deflection circuit being connected with said series resonance circuit to generate a flyback pulse in the primary winding of said transformer each time said switching element of said horizontal deflection circuit is cut off, said resonance circuit being excited by each of said flyback pulses to generate in the primary winding of said transformer a resonance pulse of the same polarity as said flyback pulse between respective adjacent ones of said flyback pulses, said transformer boosting a combined voltage of said flyback pulses and said resonance pulses to produce a high voltage in the high voltage winding of said transformer, and said high voltage being controlled in accordance with the value of said variable inductance.

7. A high-voltage stabilizing device according to claim 6, in which said series circuit of the first capacitor and the parallel circuit of the variable inductance and the second capacitor is inserted between ground and said transformer, and a third capacitor is connected in parallel with said series circuit to bypass a higher harmonic generated in the high voltage winding of said transformer.

8. A high-voltage stabilizing device according to claim 6, in which the resonance frequency of said resonance circuit is approximated to a horizontal scanning frequency at which said switching element of said horizontal deflection circuit switches.

* * * * *